(12) United States Patent
Pearson

(10) Patent No.: US 11,529,894 B1
(45) Date of Patent: Dec. 20, 2022

(54) CAR SEAT SECURING ASSEMBLY

(71) Applicant: Benjamin Pearson, Tustin, MI (US)

(72) Inventor: Benjamin Pearson, Tustin, MI (US)

( * ) Notice: Subject to any disclaimer, the term of this patent is extended or adjusted under 35 U.S.C. 154(b) by 0 days.

(21) Appl. No.: 17/487,994

(22) Filed: Sep. 28, 2021

(51) Int. Cl.
*B60N 2/28* (2006.01)

(52) U.S. Cl.
CPC ................... *B60N 2/2827* (2013.01)

(58) Field of Classification Search
CPC .. B60N 2/2893; B60N 2/2887; B60N 2/2827; B60R 2021/2078; B60R 21/207
See application file for complete search history.

(56) References Cited

U.S. PATENT DOCUMENTS

| | | | |
|---|---|---|---|
| 5,669,663 A | 9/1997 | Fuerherdt | |
| 5,971,479 A | 10/1999 | Jacquemot | |
| 6,030,046 A | 2/2000 | Dorow | |
| 6,082,818 A * | 7/2000 | Muller | B60N 2/28 297/250.1 |
| 6,199,949 B1 | 3/2001 | DaSilva | |
| D468,993 S | 1/2003 | Votruba | |
| 7,338,121 B1 * | 3/2008 | Pilcher | B60N 2/0232 297/378.12 |
| 7,364,213 B2 | 4/2008 | Romolo | |
| 8,713,765 B2 | 5/2014 | Buckingham | |
| 8,926,014 B2 | 1/2015 | Su | |
| 9,688,166 B2 | 6/2017 | Ruthinowski | |

FOREIGN PATENT DOCUMENTS

DE        10128670 C1 *  6/2002   ............... B60N 2/28

* cited by examiner

*Primary Examiner* — Sarah B McPartlin

(57) ABSTRACT

A car seat securing assembly includes a pair of locking units that can each be positioned between a seat portion of a vehicle seat and a backrest portion of the vehicle seat. Each of the locking units includes a latching element which extends outwardly between the seat portion and the backrest portion. The latching element in each of the locking units is biased into a released position to engage an engagement on a child car seat. The latching element in each of the locking units is urgeable into a locked position to secure the child car seat to the vehicle seat. A first lever is pivotally coupled to a respective one of the locking units to urge the latching element between the released position and the locked position. A second lever is pivotally coupled between each of the locking units to urge the latching between the released position and the locking position.

13 Claims, 6 Drawing Sheets

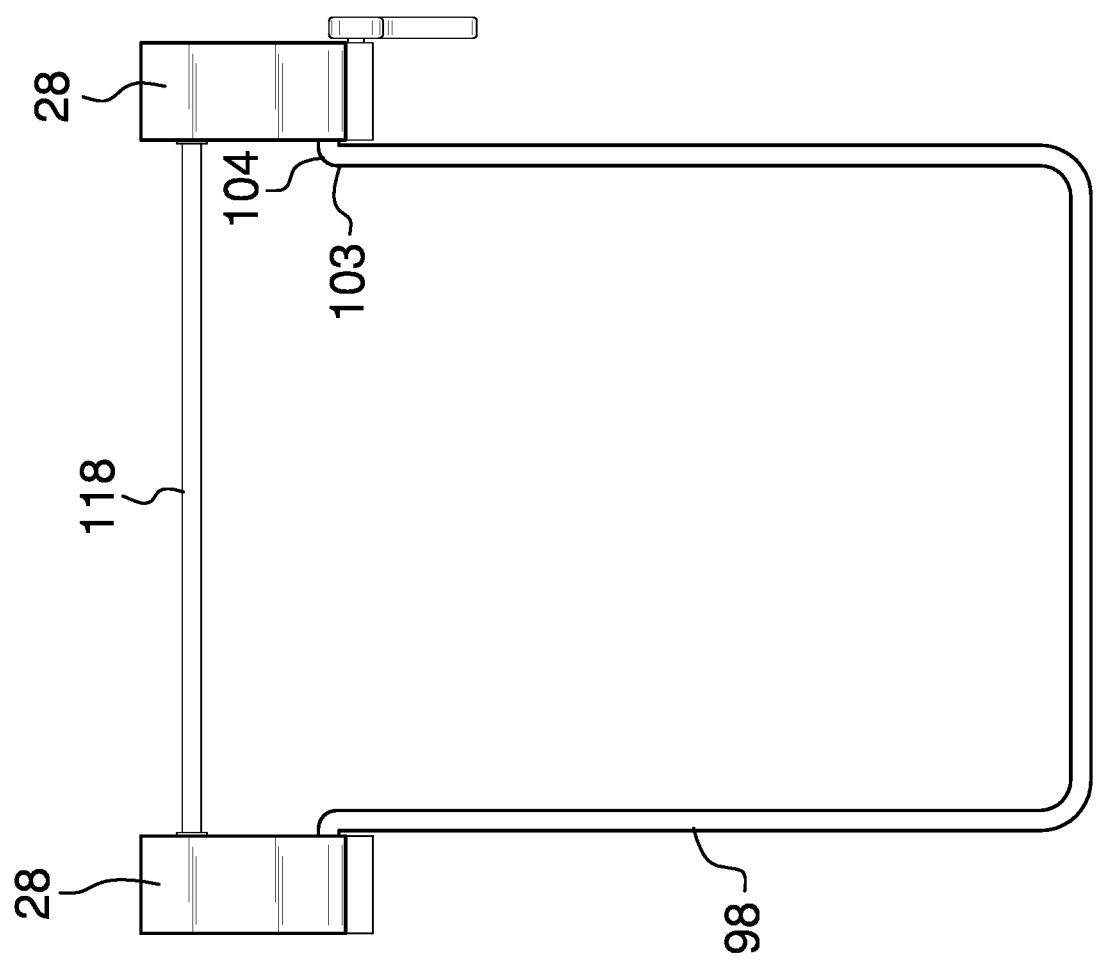

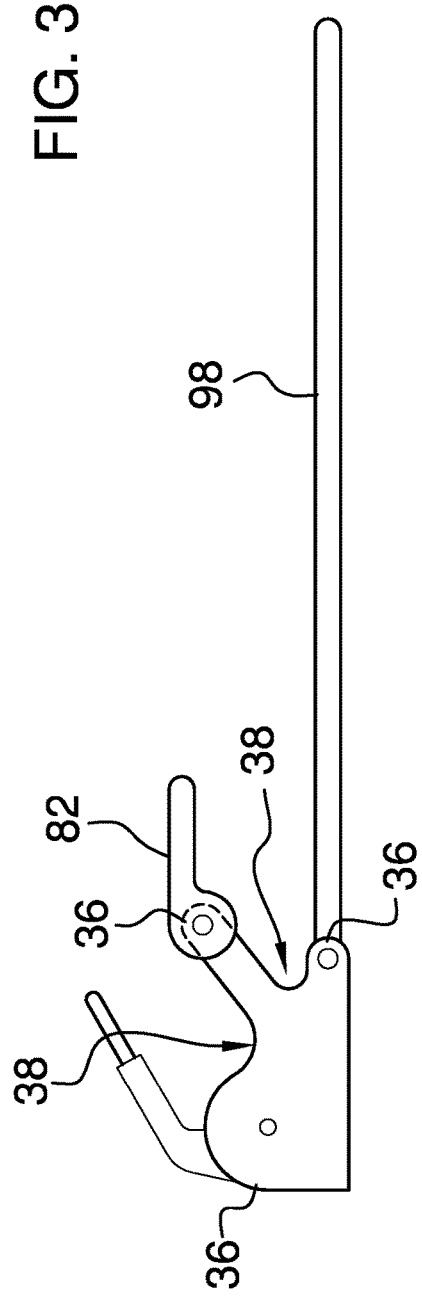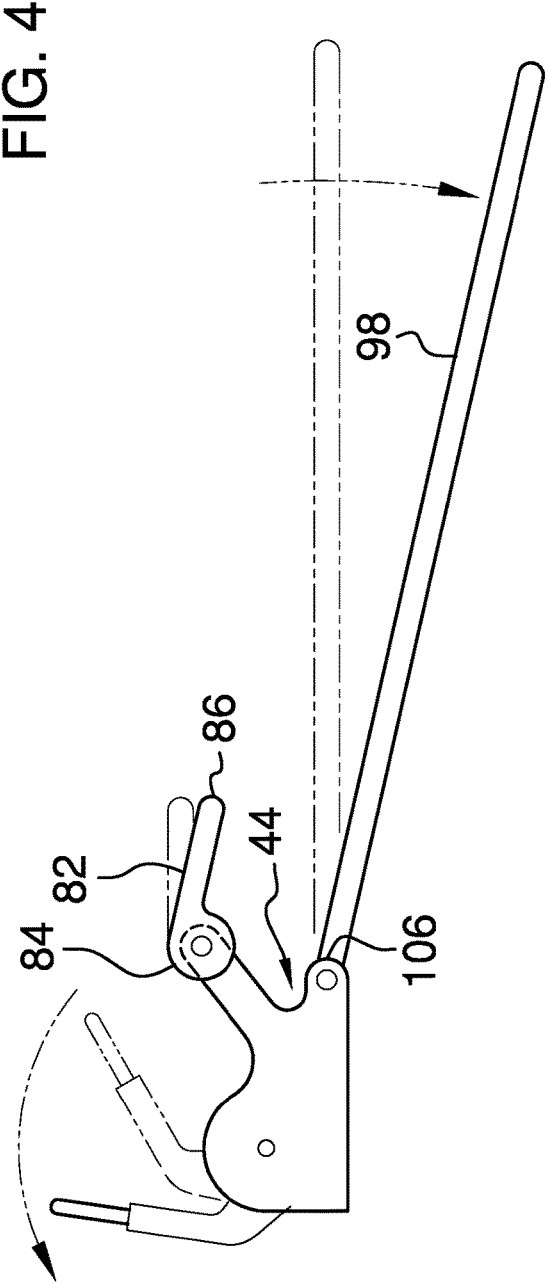

CAR SEAT SECURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to securing devices and more particularly pertains to a new securing device for securing a child car seat to a vehicle seat. The securing device includes a pair of locking unit which each includes a latching element. The latching element on each of the locking units releasably engages a respective engagement on a child car seat. The device includes a first lever that is in communication with the latching element on each of the locking units to urge the latching units between a locked position and a released position.

(2) Description of Related Art Including Information Disclosed Under 37 CFR 1.97 and 1.98

The prior art relates to securing devices including a child car seat lock that includes a socket that is incorporated into a vehicle seat and pin that is coupled to a child car seat that releasably engages the socket. The prior art discloses a variety of child car seats which have a securing mechanism that is complementary to a vehicle car seat for attaching the child car seat to the vehicle seat. The prior art discloses a child car seat attachment that includes a frame which rests on a vehicle seat and a plurality of latches, each disposed on the frame, that engage a child car seat. The prior art discloses a variety of anchorage adjustment devices that each at least includes a gear and a toothed armature that releasably engages the gear.

BRIEF SUMMARY OF THE INVENTION

An embodiment of the disclosure meets the needs presented above by generally comprising a pair of locking units that can each be positioned between a seat portion of a vehicle seat and a backrest portion of the vehicle seat. Each of the locking units includes a latching element which extends outwardly between the seat portion and the backrest portion. The latching element in each of the locking units is biased into a released position to engage an engagement on a child car seat. The latching element in each of the locking units is urgeable into a locked position to secure the child car seat to the vehicle seat. A first lever is pivotally coupled to a respective one of the locking units to urge the latching element between the released position and the locked position. A second lever is pivotally coupled between each of the locking units to urge the latching between the released position and the locking position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom view of an embodiment of the disclosure.

FIG. 3 is a right side view of an embodiment of the disclosure showing a latching element in a locked position.

FIG. 4 is a right side view of an embodiment of the disclosure showing a latching element in a released position.

DETAILED DESCRIPTION OF THE INVENTION

Figure 1:
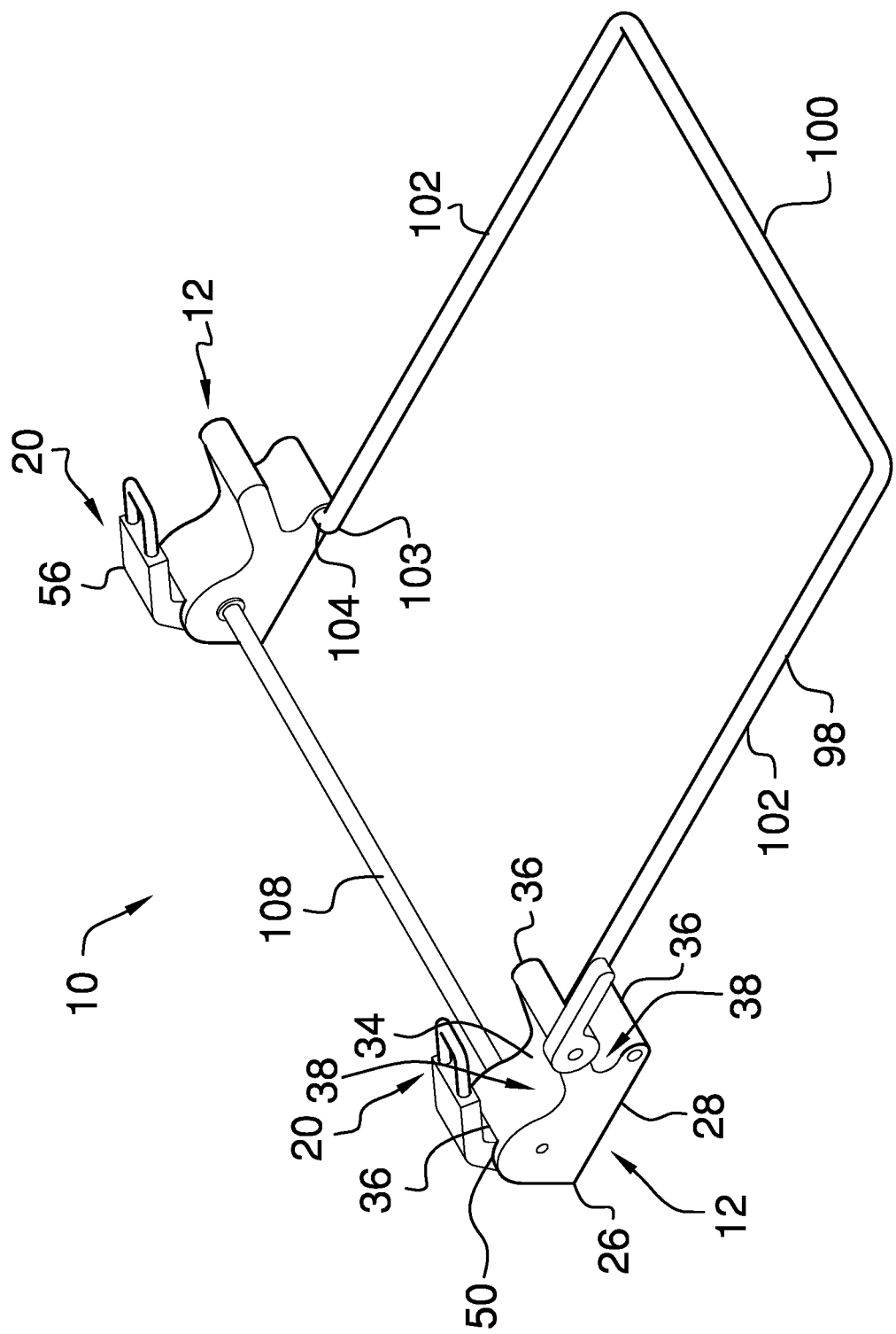
FIG. 1 is a top perspective view of a car seat securing assembly according to an embodiment of the disclosure.
Figure 5:
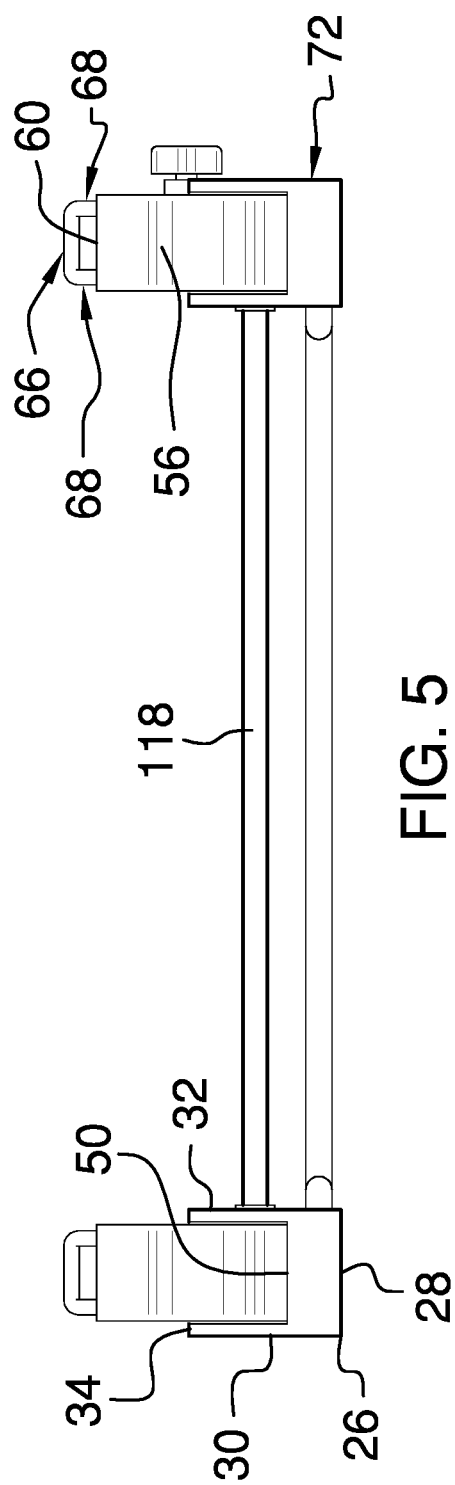
FIG. 5 is a back view of an embodiment of the disclosure.
Figure 6:
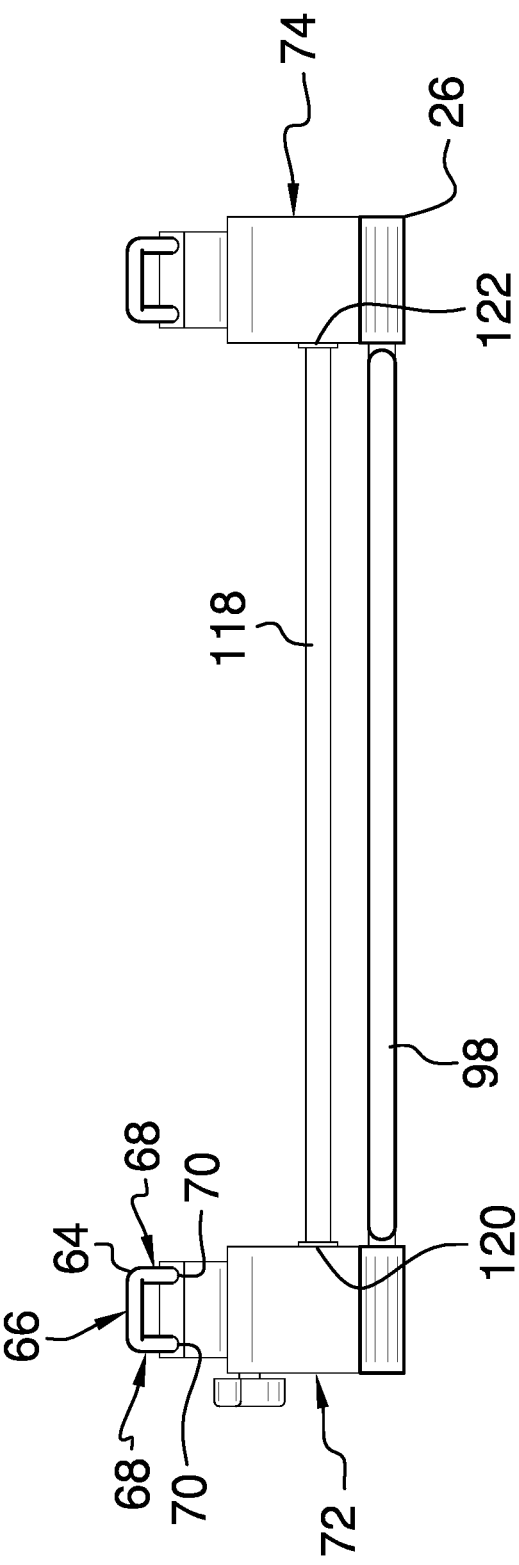
FIG. 6 is a front view of an embodiment of the disclosure.
Figure 7:
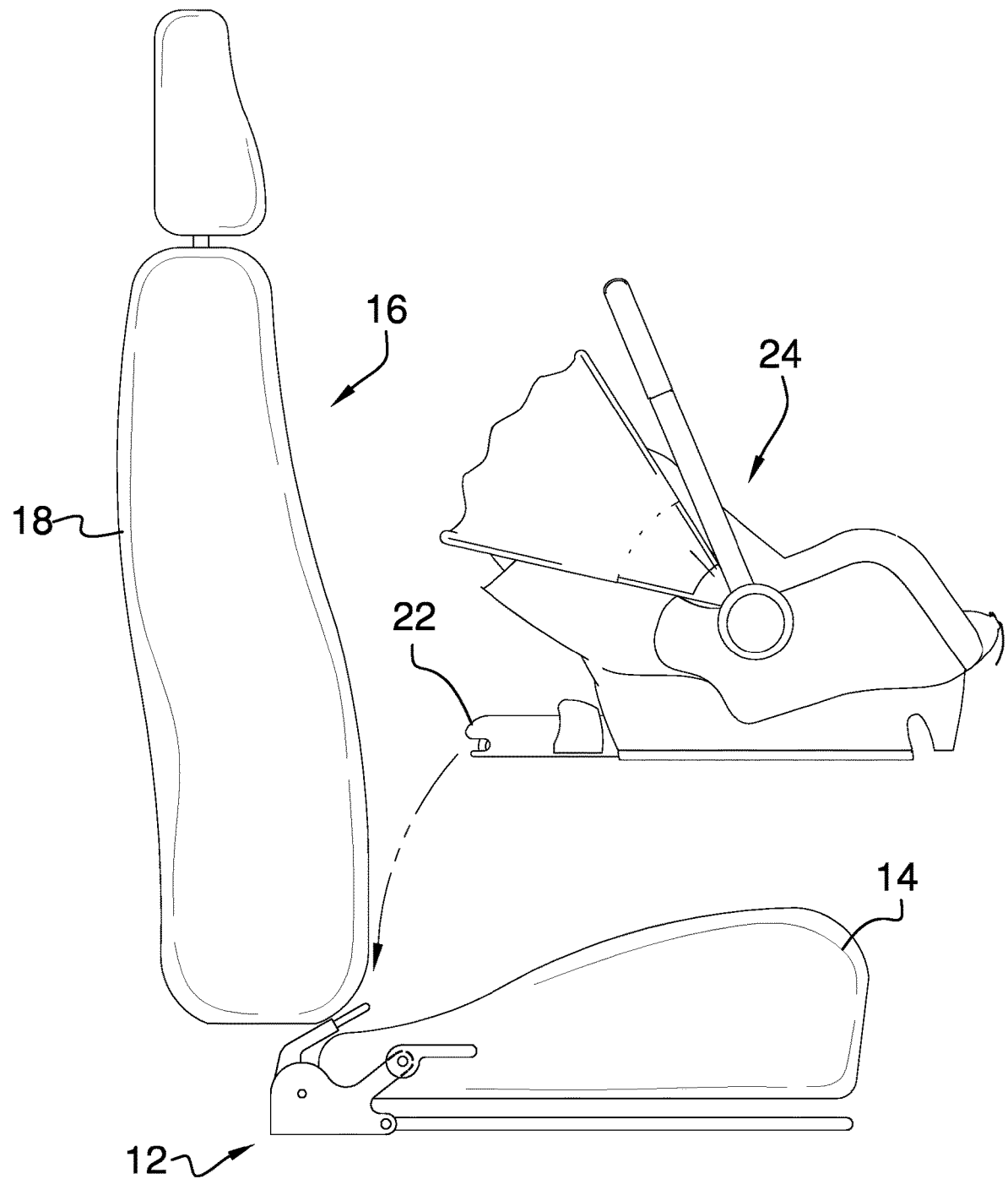
FIG. 7 is a perspective in-use view of an embodiment of the disclosure.
Figure 8:
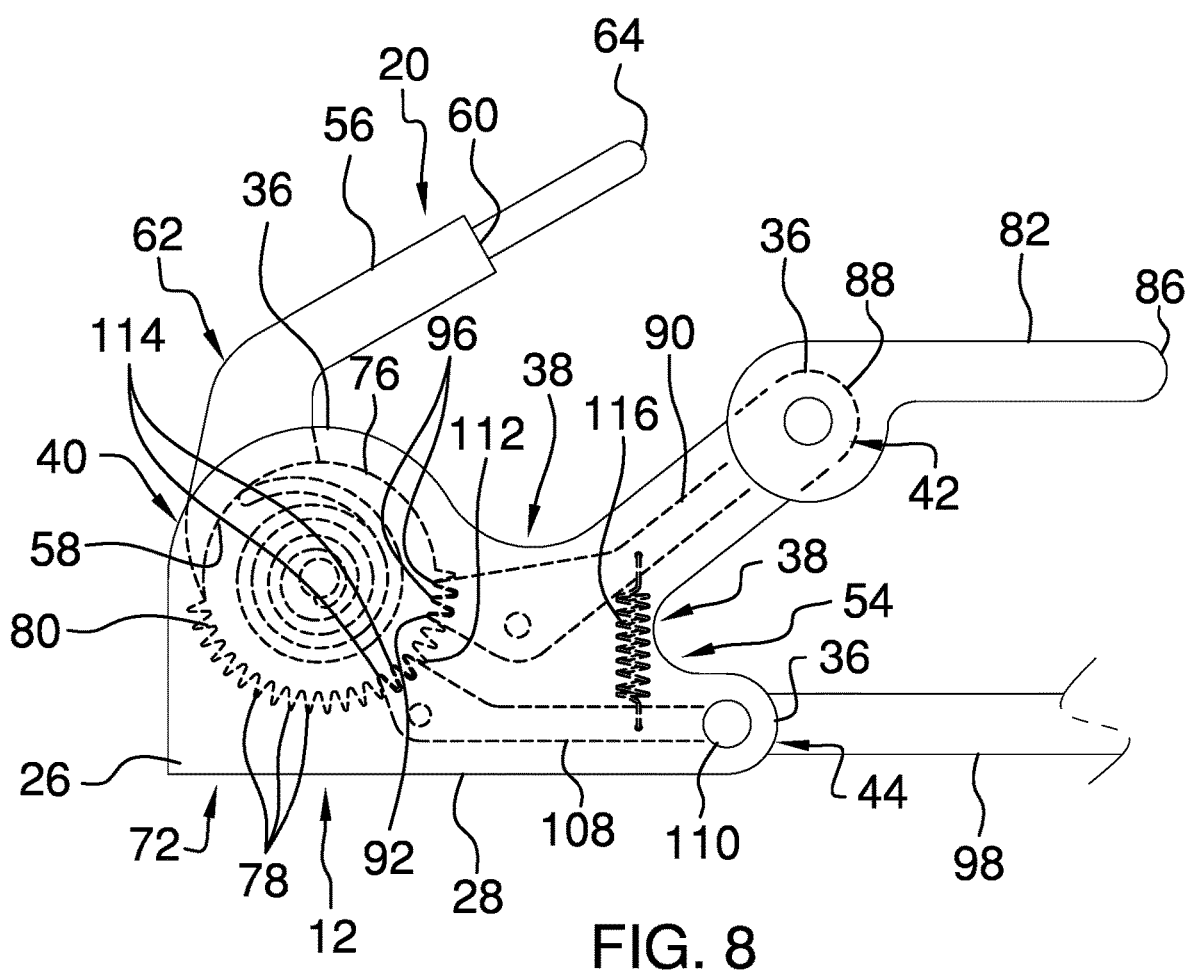
FIG. 8 is a detailed partial side view of an embodiment of the disclosure.

With reference now to the drawings, and in particular to FIGS. 1 through 8 thereof, a new securing device embodying the principles and concepts of an embodiment of the disclosure and generally designated by the reference numeral 10 will be described.

As best illustrated in FIGS. 1 through 8, the car seat securing assembly 10 generally comprises a pair of locking units 12 that can each be positioned between a seat portion 14 of a vehicle seat 16 and a backrest portion 18 of the vehicle seat 16. The vehicle seat 16 may be a rear seat in a passenger vehicle or any other type of motorized vehicle that is driven on public roadways. Each of the locking units 12 includes a latching element 20 that is movably integrated into the locking units 12. Furthermore, the latching element 20 in each of the locking units 12 extends outwardly between the seat portion 14 and the backrest portion 18. The latching element 20 in each of the locking units 12 is biased into a released position to engage an engagement 22 on a child car seat 24. Furthermore, the latching element 20 in each of the locking units 12 is urgeable into a locked position to secure the child car seat 24 to the vehicle seat 16. The child car seat 24 may be a child safety seat of any conventional design that employs lower anchors and tethers for children (LATCH 64).

Each of the locking units 12 comprises a housing 26 has a lower wall 28, a first lateral wall 30, a second lateral wall 32 and a top wall 34, and the top wall 34 undulates to define a series of lobes 36 and depressions 38. The series of lobes 36 includes a rear lobe 40, a middle lobe 42 and a forward lobe 44. The rear lobe 40 is aligned with a rear end 46 of the housing 26 and the rear lobe 40 extends along an axis that is oriented perpendicular to the lower wall 28. The middle lobe 42 is positioned closer to a forward end 48 of the housing 26 than the rear end 46 of the housing 26. Additionally, the middle lobe 42 extends along an axis angling toward the forward end 48. The forward lobe 44 is aligned with the forward end 48 of the housing 26 and the forward lobe 44 extends along an axis is oriented parallel to the lower wall 28.

The top wall 34 has an opening 50 extending into an interior of the housing 26 and the opening 50 is positioned on the rear lobe 40. The depressions 38 include a first depression 52 that is positioned between the rear lobe 40 and the middle lobe 42, and the first depression 52 extends toward the lower wall 28. The depressions 38 include a second depression 54 that is positioned between the middle lobe 42 and the forward lobe 44, and the second depression 54 extends toward the rear end 46 of the housing 26.

The latching element 20 in each of the locking units 12 comprises an arm 56 that has a lower end 58 and an upper end 60. The arm 56 has a bend 62 which is positioned between the lower end 58 and the upper end 60. Furthermore, the arm 56 extends outwardly through the opening 50 in the top wall 34 of the housing 26 having the lower end 58 being positioned within the housing 26 and having the upper end 60 being positioned outside of the housing 26. The upper end 60 is directed toward the forward end 48 of the housing 26. The arm 56 extends upwardly from the housing 26 when the latching element 20 associated with each of the locking units 12 are in the released position. Additionally, the arm 56 angles toward the forward end 48 of the housing 26 when the latching element 20 associated with each of the locking units 12 are in the locked position.

The latching element 20 associated with each of the locking units 12 includes a latch 64 that has a central portion 66 extending between a pair of outward portions 68. Each of the outward portions 68 has a distal end 70 with respect to the central portion 66. The distal end 70 of each of the outward portions 68 is coupled to the upper end 60 of the arm 56 having the central portion 66 being spaced from the upper end 60. Additionally, the latch 64 engages the engagement 22 on the child car seat 24. The engagement 22 on the child car seat 24 may be common to a lower anchors and tethers for children (LATCH) systems. Additionally, the latch 64 has dimensions that correspond to lower anchors and tethers for children (LATCH) systems. The central portion 66 of the latch 64 is aligned with the first depression 52 in the top wall 34 of a respective housing 26 when the latching element 20 associated with each of the locking units 12 are in the locked position. In this way the first depression 52 accommodates the structure of the engagement 22 on the child car seat 24 when the latch 64 engages the engagement 22 on the child car seat 24.

The pair of locking units 12 includes a master locking unit 72 and a slave locking unit 74. The master locking unit 72 includes a gear 76 that is disposed on the lower end 58 of the arm 56 associated with the master locking unit 72. The gear 76 has a plurality of teeth 78 that is distributed around an outer edge 80 of the gear 76, and the gear 76 is rotatable in a first direction or a second direction. The lower end 58 of the arm 56 associated with the master locking unit 72 is disposed on the outer edge 80 of the gear 76. The arm 56 associated with the master locking unit 72 is positioned in a releasing position when the gear 76 rotates in the first direction. Conversely, the arm 56 associated with the master locking unit 72 is positioned in a locking position when the gear 76 rotates in the second direction.

A first lever 82 is pivotally coupled to a respective one of the locking units 12 thereby facilitating the first lever 82 to be manipulated. The first lever 82 is in mechanical communication with the latching element 20 in the respective locking unit. The first lever 82 urges the latching element 20 in the respective locking unit between the between the released position and the locked position. The first lever 82 has a coupled end 84 and a free end 86, and the coupled end 84 is pivotally disposed on the first lateral wall 30 of the housing 26 associated with the master locking unit 72. The coupled end 84 is positioned on a distal end 88 of the middle lobe 42 such that the free end 86 is directed forwardly with respect to the forward end 48 of the housing 26.

A first finger 90 is included that has a first end 92 and a second end 94, and the first end 92 has a plurality of teeth 96 integrated into the first end 92. The first finger 90 is pivotally disposed within the housing 26 associated with the master locking unit 72, and the second end of the first finger 90 is in communication with the coupled end 84 of the first lever 82. Each of the teeth 96 on the first end 92 of the first finger 90 engages respective teeth 78 on the gear 76 when the first lever 82 is positioned in an engaging position. Conversely, each of the teeth 96 on the first end 92 of the first finger 90 disengages the respective teeth 78 on the gear 76 when the first lever 82 is manipulated into a releasing position.

A second lever 98 is pivotally coupled to and extends between each of the locking units 12 such that the second lever 98 is can be manipulated. The second lever 98 is in communication with the latching element 20 in each of the locking units 12. In this way the second lever 98 urges the latching element 20 in each of the locking units 12 between the released position and the locking position. The second lever 98 comprises a middle member 100 extending between a pair of outward members 102.

Each of the outward members 102 has a bend 103 thereon to define a foot 104 extending laterally away from the outward members 102. Moreover, the foot 104 on each of the outward members 102 extends through the second lateral wall 32 of the housing 26 associated with each of the locking units 12 at a point that is located adjacent to a distal end 106 of the forward lobe 44 on the housing 26 associated with each of the locking units 12. Each of the outward members 102 extends forwardly from the forward end 48 of the housing 26 associated with each of the locking units 12. Thus, the second lever 98 extends beneath the seat portion 14 of the vehicle seat 16 such that the middle member 100 can be gripped for manipulating the second lever 98.

A second finger 108 is provided that has a primary end 110 and a secondary end 112, and plurality of teeth 114 is integrated into the secondary end 112. The second finger 108 is pivotally disposed within the housing 26 associated with the master locking unit 72. Furthermore, the primary end 110 of the second finger 108 is engaged to the foot 104 of the outward member 102 which extends through the second lateral wall 32 of the housing 26 associated with the master locking unit 72. Each of the teeth 114 on the secondary end 112 engages respective teeth 78 on the gear 76 when the second lever 98 is positioned in an engaging position. Conversely, each of the teeth 114 on the secondary end 112 disengages the respective teeth 78 on the gear 76 when the second lever 98 is positioned in a disengaging position.

A spring 116 is coupled between the first finger 90 and the second finger 108. The spring 116 urges the second finger 108 to pivot such that the teeth 114 on the secondary end 112 disengage the teeth 78 on the gear 76 when the first finger 90 pivots. In this way the gear 76 is facilitated to rotate when the first lever 82 is manipulated into the releasing position. Additionally, the spring 116 facilitates the teeth 114 on the secondary end 112 of the second finger 108 engage the respective teeth 78 on the gear 76 when the second lever 98 is urged into the engaging position while the first lever 82 is in the disengaging position.

A rod 118 is provided that has a first end 120 and a second end 122, and the rod 118 extends between the housing 26 associated with each of the locking units 12. The first end 120 of the rod 118 is coupled to the gear 76 in the housing 26 associated with the master locking unit 72. The second end 122 of the rod 118 is coupled to the lower end 58 of the arm 56 of the latching element 20 of the slave locking unit 74. In this way the arm 56 of the latching element 20 associated with the master locking unit 72 is in mechanical communication with the arm 56 of the latching element 20 of the slave locking unit 74. Moreover, the arm 56 of the latching element 20 of the slave locking unit 74 moves in tandem with the arm 56 of the latching element 20 of the master locking unit 72.

In use, the child car seat 24 is positioned on the vehicle seat 16 such that each of the engagements 22 on the child car seat 24 engages a respective one of the latching element 20 associated with each of the locking units 12. The first lever 82 is manipulated into the disengaging position to facilitate the latching element 20 associated with each of the locking units 12 to be pivoted into the locked position when the child car seat 24 is pressed downwardly. The second lever 98 is urged into the engaging position to secure the latching element 20 associated with each of the locking units 12 in the locked position and the first lever 82 is released. In this way the latching element 20 associated with each of the locking units 12 is retained in the locked position for securing the child car seat 24 to the vehicle seat 16. The first lever 82 is manipulated into the disengaging position to facilitate the latching element 20 associated with each of the locking units 12 to be biased into the released position. In this way the child car seat 24 can be removed from the vehicle seat 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A car seat securing assembly for securing a child car seat in a vehicle, said assembly comprising:
   a pair of locking units each being configured to be positioned between a seat portion of a vehicle seat and a backrest portion of the vehicle seat, each of said locking units including a latching element being movably integrated into said locking units wherein said latching element in each of said locking units is configured to extend outwardly between the seat portion and the backrest portion, said latching element in each of said locking units being biased into a released position wherein said latching element in each of said locking units is configured to engage an engagement on a child car seat, said latching element in each of said locking units being urgeable into a locked position wherein said latching element in each of said locking units is configured to secure the child car seat to the vehicle seat;
   a first lever being pivotally coupled to a respective one of said locking units wherein said first lever is configured to be manipulated, said first lever being in mechanical communication with said latching element in said respective locking unit, said first lever urging said latching element in said respective locking unit between said between said released position and said locked position; and
   a second lever being pivotally coupled to and extending between each of said locking units wherein said second lever is configured to be manipulated, said second lever being in communication with said latching element in each of said locking units, said second lever urging said latching element in each of said locking units between said released position and said locked position.

2. The assembly according to claim 1, wherein:
   each of said locking units comprises a housing having a lower wall, a first lateral wall, a second lateral wall and a top wall, said top wall undulating to define a series of lobes and depressions;
   said series of lobes includes a rear lobe, a middle lobe and a forward lobe;
   said rear lobe is aligned with a rear end of said housing, said rear lobe extending along an axis being oriented perpendicular to said lower wall;
   said middle lobe is positioned closer to a forward end of said housing than said rear end of said housing, said middle lobe extending along an axis angling toward said forward end;
   said forward lobe is aligned with said forward end of said housing, said forward lobe extending along an axis being oriented parallel to said lower wall; and
   said top wall has an opening extending into an interior of said housing, said opening being positioned on said rear lobe.

3. The assembly according to claim 2, wherein:
said depressions includes a first depression being positioned between said rear lobe and said middle lobe, said first depression extending toward said lower wall; and
said depressions includes a second depression being positioned between said middle lobe and said forward lobe, said second depression extending toward said rear end of said housing.

4. The assembly according to claim 2, wherein said latching element in each of said locking units comprises an arm having a lower end and an upper end, said arm having a bend being positioned between said lower end and said upper end, said arm extending outwardly through said opening in said top wall of said housing having said lower end being positioned within said housing and having said upper end being positioned outside of said housing, said upper end being directed toward said forward end of said housing, said arm extending upwardly from said housing when said latching elements are in said released position, said arm angling toward said forward end of said housing when said latching elements are in said locked position.

5. The assembly according to claim 4, wherein said latching element in each of said locking units includes a latch having a central portion extending between a pair of outward portions, each of said outward portions having a distal end with respect to said central portion, said distal end of each of said outward portions being coupled to said upper end of said arm having said central portion being spaced from said upper end, said latch configured to engage the engagement on the child car seat.

6. The assembly according to claim 4, wherein:
said pair of locking units includes a master locking unit and a slave locking unit; and
said master locking unit including a gear being disposed on said lower end of said arm associated with said master locking unit, said gear having a plurality of teeth being distributed around an outer edge of said gear, said lower end of said arm associated with said master locking unit being disposed on said outer edge of said gear, said gear being rotatable in a first direction or a second direction, said arm associated with said master locking unit being positioned in a releasing position when said gear rotates in said first direction, said arm associated with said master locking unit being positioned in a locking position when said gear rotates in said second direction.

7. The assembly according to claim 6, wherein said first lever has a coupled end and a free end, said coupled end being pivotally disposed on said first lateral wall of said housing associated with said master locking unit, said coupled end being positioned on a distal end of said middle lobe such that said free end is directed forwardly with respect to said forward end of said housing.

8. The assembly according to claim 7, further comprising a first finger having a first end and a second end, said first end having a plurality of teeth being integrated into said first end, said first finger being pivotally disposed within said housing associated with said master locking unit, said second end being in communication with said coupled end of said first lever, each of said teeth on said first end engaging said teeth on said gear when said first lever is positioned in an engaging position, each of said teeth on said first end disengaging said teeth on said gear when said first lever is manipulated into a releasing position.

9. The assembly according to claim 6, wherein:
said assembly includes a rod having a first end and a second end;
said rod extends between said housing associated with each of said locking units;
said first end of said rod is coupled to said gear in said housing associated with said master locking unit;
said second end of said rod is coupled to said lower end of said arm of said latching element of said slave locking unit such that said arm of said latching element associated with said master locking unit is in mechanical communication with said arm of said latching element of said slave locking unit; and
said arm of said latching element of said slave locking unit moves in tandem with said arm of said latching element of said master locking unit.

10. The assembly according to claim 2, wherein:
said second lever comprises a middle member extending between a pair of outward members, each of said outward members having a bend thereon to define a foot extending laterally away from said outward members;
said foot on each of said outward members extends through said second lateral wall of said housing associated with each of said locking units at a point located adjacent to a distal end of said forward lobe on said housing associated with each of said locking units; and
each of said outward members extends forwardly from said forward end of said housing associated with each of said locking units wherein said second lever is configured to extend beneath the seat portion of the vehicle seat wherein said central member is configured to be gripped for manipulating said second lever.

11. The assembly according to claim 10, wherein:
each of said latching elements includes an arm;
said pair of locking units includes a master locking unit and a slave locking unit;
said master locking unit including a gear being disposed on a lower end of said arm associated with said master locking unit, said gear having a plurality of teeth being distributed around an outer edge of said gear; and
said assembly includes a second finger having a primary end and a secondary end, said secondary end having a plurality of teeth being integrated into said secondary end, said second finger being pivotally disposed within said housing associated with said master locking unit, said primary end of said second finger being engaged to said foot of said outward member which extends through said second lateral wall of said housing associated with said master locking unit; each of said teeth on said secondary end engaging respective teeth on said gear when said second lever is positioned in an engaging position, each of said teeth on said secondary end disengaging said teeth on said gear when said second lever is positioned in a disengaging position.

12. The assembly according to claim 1, further comprising:
a first finger having teeth being integrated into a first end of said first finger;
a second finger having a primary end and a secondary end, said secondary end having teeth being integrated into said secondary end;
a gear having teeth being integrated into said gear; and
a spring being coupled between said first finger and said second finger, said spring urging said second finger to pivot such that said teeth on said secondary end disengage said teeth on said gear when said first finger pivots thereby facilitating said gear to rotate when said first lever is manipulated into a releasing position.

13. A car seat securing assembly for securing a child car seat in a vehicle, said assembly comprising:
- a pair of locking units each being configured to be positioned between a seat portion of a vehicle seat and a backrest portion of the vehicle seat, each of said locking units including a latching element being movably integrated into said locking units wherein said latching element in each of said locking units is configured to extend outwardly between the seat portion and the backrest portion, said latching element in each of said locking units being biased into a released position wherein said latching element in each of said locking units is configured to engage an engagement on a child car seat, said latching element in each of said locking units being urgeable into a locked position wherein said latching element in each of said locking units is configured to secure the child car seat to the vehicle seat, each of said locking units comprising a housing having a lower a first lateral wall, a second lateral wall and a top wall, said top wall undulating to define a series of lobes and depressions, said series of lobes including a rear lobe, a middle lobe and a forward lobe, said rear lobe being aligned with a rear end of said housing, said rear lobe extending along an axis being oriented perpendicular to said lower wall, said middle lobe being positioned closer to a forward end of said housing than said rear end of said housing, said middle lobe extending along an axis angling toward said forward end, said forward lobe being aligned with said forward end of said housing, said forward lobe extending along an axis being oriented parallel to said lower wall, said depressions including a first depression being positioned between said rear lobe and said middle lobe, said first depression extending toward said lower wall, said depressions including a second depression being positioned between said middle lobe and said forward lobe, said second depression extending toward said rear end of said housing, said top wall having an opening extending into an interior of said housing, said opening being positioned on said rear lobe, said latching element in each of said locking units comprising:
  - an arm having a lower end and an upper end, said arm having a bend being positioned between said lower end and said upper end, said arm extending outwardly through said opening in said top wall of said housing having said lower end being positioned within said housing and having said upper end being positioned outside of said housing, said upper end being directed toward said forward end of said housing, said arm extending upwardly from said housing when said latching elements are in said released position, said arm angling toward said forward end of said housing when said latching elements are in said locked position; and
  - a latch having a central portion extending between a pair of outward portions, each of said outward portions having a distal end with respect to said central portion, said distal end of each of said outward portions being coupled to said upper end of said arm having said central portion being spaced from said upper end, said latch configured to engage the engagement on the child car seat;
- wherein said pair of locking units includes a master locking unit and a slave locking unit, said master locking unit including a gear being disposed on said lower end of said arm associated with said master locking unit, said gear having a plurality of teeth being distributed around an outer edge of said gear, said lower end of said arm associated with said master locking unit being disposed on said outer edge of said gear, said gear being rotatable in a first direction or a second direction, said arm associated with said master locking unit being positioned in a releasing position when said gear rotates in said first direction, said arm associated with said master locking unit being positioned in a locking position when said gear rotates in said second direction;
- a first lever being pivotally coupled to a respective one of said locking units wherein said first lever is configured to be manipulated, said first lever being in mechanical communication with said latching element in said respective locking unit, said first lever urging said latching element in said respective locking unit between said between said released position and said locked position, said first lever having a coupled end and a free end, said coupled end being pivotally disposed on said first lateral wall of said housing associated with said master locking unit, said coupled end being positioned on a distal end of said middle lobe such that said free end is directed forwardly with respect to said forward end of said housing;
- a first finger having a first end and a second end, said first end having a plurality of teeth being integrated into said first end, said first finger being pivotally disposed within said housing associated with said master locking unit, said second end being in communication with said coupled end of said first lever, each of said teeth on said first end engaging said teeth on said gear when said first lever is positioned in an engaging position, each of said teeth on said first end disengaging said teeth on said gear when said first lever is manipulated into a releasing position;
- a second lever being pivotally coupled to and extending between each of said locking units wherein said second lever is configured to be manipulated, said second lever being in communication with said latching element in each of said locking units, said second lever urging said latching element in each of said locking units between said released position and said locking position, said second lever comprising middle member extending between a pair of outward members, each of said outward members having a bend thereon to define a foot extending laterally away from said outward members, said foot on each of said outward members extending through said second lateral wall of said housing associated with each of said locking units at a point located adjacent to a distal end of said forward lobe on said housing associated with each of said locking units, each of said outward members extending forwardly from said forward end of said housing associated with each of said locking units wherein said second lever is configured to extend beneath the seat portion of the vehicle seat wherein said central member is configured to be gripped for manipulating said second lever;
- a second finger having a primary end and a secondary end, said secondary end having a plurality of teeth being integrated into said secondary end, said second finger being pivotally disposed within said housing associated with said master locking unit, said primary end of said second finger being engaged to said foot of said outward member which extends through said second lateral wall of said housing associated with said master locking unit, each of said teeth on said secondary end engaging respective teeth on said gear when said second lever is positioned in an engaging position, each of said teeth on said secondary end disengaging said teeth on said gear when said second lever is positioned in a disengaging position a spring being coupled between said first finger and said second finger, said spring urging said second finger to pivot such that said teeth on said secondary end disengage said teeth on said gear when said first finger pivots thereby facilitating said gear to rotate when said first lever is manipulated into said releasing position; and a rod having a first end and a second end, said rod extending between said housing associated with each of said locking units, said first end of said rod being coupled to said gear in said housing associated with said master locking unit, said second end of said rod being coupled to said tower end of said arm of said latching element of said slave locking unit such that said arm of said latching element associated with said master locking unit is in mechanical communication with said arm of said latching element of said slave locking unit, said arm of said latching element of said slave locking unit moving in tandem with said arm of said latching element of said master locking unit.

* * * * *